United States Patent [19]

Langenohl

[11] Patent Number: 5,318,932
[45] Date of Patent: Jun. 7, 1994

[54] SILICON CARBIDE REFRACTORY COMPOSITION AND PRODUCTS

[75] Inventor: Mark C. Langenohl, Pittsburgh, Pa.

[73] Assignee: Indresco Inc., Dallas, Tex.

[21] Appl. No.: 99,363

[22] Filed: Jul. 28, 1993

Related U.S. Application Data

[63] Continuation-in-part of Ser. No. 63,922, May 19, 1993, abandoned.

[51] Int. Cl.⁵ ............................................. C04B 35/56
[52] U.S. Cl. ................................... 501/89; 501/88
[58] Field of Search .................................. 501/89, 88

[56] References Cited

U.S. PATENT DOCUMENTS

| | | | |
|---|---|---|---|
| 2,118,789 | 5/1938 | Fisher | 501/89 |
| 4,072,530 | 2/1978 | Hirame et al. | 501/89 |
| 4,080,415 | 3/1978 | Coppola et al. | 501/88 X |
| 4,218,254 | 8/1980 | Kiehl et al. | |
| 4,800,181 | 1/1989 | Lassiter et al. | 501/89 |
| 5,214,006 | 5/1993 | Langenohl | 501/89 |

FOREIGN PATENT DOCUMENTS

| | | | |
|---|---|---|---|
| 0294697 | 10/1991 | Fed. Rep. of Germany | C04B 35/56 |
| 033262 | 7/1983 | Japan . | |
| 553232 | 7/1975 | U.S.S.R. . | |
| 0697473 | 11/1979 | U.S.S.R. | 501/89 |
| 1175911 | 8/1985 | U.S.S.R. | 501/89 |
| 1728195 | 4/1992 | U.S.S.R. | C04B 35/56 |

*Primary Examiner*—Mark L. Bell
*Assistant Examiner*—David R. Sample
*Attorney, Agent, or Firm*—John L. Sigalos

[57] ABSTRACT

A plastic refractory composition in which the constituents are silicon carbide grain having a SiC content of at least 92% SiC, a calcined or reactive alumina, up to 10% bentonite, and 0.5 to 5% boron phosphate. A phosphorous-containing liquid is used to bind the composition when used.

Also disclosed are pressed shapes, particularly tiles, made from such compositions in which ball clay is substituted for the bentonite.

9 Claims, No Drawings

SILICON CARBIDE REFRACTORY COMPOSITION AND PRODUCTS

CROSS-REFERENCE TO RELATED APPLICATION

This application is a continuation-in-part of U.S. application Ser. No. 08/063,922 filed May 19, 1993, now abandoned.

BACKGROUND OF THE INVENTION

The present invention relates to silicon carbide refractory compositions and, in particular, to silicon carbide based plastic refractories.

Plastic refractories comprise a blend of ground refractory materials and clays and occur in a plastic consistency suitable for ramming into place to form monolithic linings.

Such plastics (including silicon carbide-based plastics) are used in a variety of high temperature furnaces and metallurgical vessels, and while generally satisfactory have a number of deficiencies in certain particular uses. Specifically, such plastics are used in vessels which contain molten aluminum such as in troughs which are used to transfer molten aluminum from melters to holders, ramps in aluminum reverberatory furnaces which experience mechanical wear from charging, and other high wear areas of aluminum reverberatory furnaces such as hearths and bellyband areas. In these areas plastics do not have sufficient resistance to aluminum adhesion and penetration, thus limiting the service life of such plastics.

Moreover, due to erosion and/or aluminum metal penetration of the silicon carbide plastic, there is a contamination of the metal being processed in high wear areas of the trough or furnace. Also, the plastics do not have sufficient abrasion resistance for long term service.

SUMMARY OF THE INVENTION

The present invention overcomes the problems of the prior art and results in plastic refractory compositions with improved resistance to aluminum adhesion and penetration which lessens contamination of the metals being processed in metallurgical vessels with undesirable elements; e.g., silicon, iron and the like, and, moreover, which have increased abrasion resistance.

Briefly stated, the present invention comprises a plastic refractory composition comprising 50 to 90% by wt. high purity silicon carbide grain, 1 to 40% by wt. calcined or reactive alumina, up to 10% by wt. bentonite, 0.5 to 5% by wt. boron phosphate, and 1 to 10% by wt. of a phosphorous-containing binder.

The invention also comprises pressed shapes made from such compositions which are cured at a temperature and for a time to form a water-insoluble phosphate bond.

DETAILED DESCRIPTION

The components of the composition are, as noted, silicon carbide, calcined or reactive alumina, bentonite, phosphoric acid, and boron phosphate.

While additional materials can be added, such as kyanite for expansion control at elevated temperatures, it is not necessary that they be utilized.

With respect to the silicon carbide, it must be a high purity silicon carbide grain. As used herein, the term "high purity" means that the grain has at least 92% SiC content and preferably 96% SiC. Such grain is referred to in the Examples herein as "96 Grade" and it contains nominally 96% SiC. While ordinarily amounts from 50 to 90% by weight are used, it is preferred to use from 65 to 75 parts by weight of the silicon carbide grain.

Further, for optimum results it is desired to use a mixture of various grain sizes of the silicon carbide grain with the table below setting forth the ranges of the various mesh sizes that can be utilized. All mesh sizes referred to herein are Tyler standard mesh sizes.

| SiC Grain Size Ranges | |
| --- | --- |
| Mesh Size | Optimum in % by Wt. |
| +10 | 10–15 |
| −10/28 | 19–20 |
| −28/65 | 10–15 |
| −65 | 50–65 |

With respect to the alumina, while less than 10 wt. % may be utilized up to 40% is utilized for most satisfactory results with the optimum amount being in the range of about 18 to 22% by weight. Calcined alumina is preferred, but also suitable are reactive alumina and calcined bauxite. Minor amounts of hydrated alumina can be included if increased strength is desired, typically 0.1 to 5 wt. %, preferably less than 3 wt. %.

As to the bentonite, while 1 to 10% by weight can be utilized, it is preferred to utilize about 3 to 10% by weight and it is most preferred to utilize about 5–6% by weight. In making pressed products from the mix any conventional ball clay is substituted for the bentonite in an amount of about 1 to 10 wt. %.

For more suitable results, particularly in terms of resistance to aluminum penetration, it is desired to utilize boron phosphate and this is utilized in a proportion of about 1 to 2% by weight, although up to about 5% parts by weight can be utilized. Use of amounts greater than 5% can have an adverse effect on the other properties of the plastic.

The phosphorous-containing binder added is preferably phosphoric acid. Amounts from 1 to about 10% by wt. can be added in order to have it function most desirably to bind the plastic in place as the plastic is being set as heat is applied to the metallurgical vessel. In addition, the acid can act to give workability of the plastic as it is being formed.

To enhance workability, in some instances, water may be needed and the amount used will depend upon the particular formulation of the composition and those skilled in this art will add such water as required to give the desired plasticity to the mix.

The plastic refractory is formed by simply thoroughly admixing the components using manufacturing techniques conventionally used for these types of products.

To form thermally conductive refractory shapes from the compositions it is only necessary to form it into the shape desired in any conventional press using conventional pressing pressure; i.e., about 10,000 psi, and to cure the shape at a temperature and for a time sufficient to form a water-insoluble aluminum phosphate bond. Ordinarily, this is accomplished at a minimum temperature of about 600° F. over a minimum four hour hold and at a maximum temperature of 2400° F. The optimum time-temperature for any given composition can be determined by routine testing based on when the phosphate bond becomes water-insoluble. For such shapes, and particularly tiles, it is preferred to substitute any conventional ball clay for the bentonite.

The invention will be further described in connection with the following examples which are set forth for purposes for illustration only.

EXAMPLES 1 AND 2

Plastic refractory mixes were formed having the mix formulations set forth in Table I below. The mix of Example 1 is a standard SiC plastic and that of Example 2 is in accord with the instant invention and all the SiC used had a minimum of 95% SiC content. The mixes were tested for workability, an important feature for plastic refractory mixes. The mix of Example 2 had better workability and required less water than the standard.

TABLE I

| | Example No. | |
|---|---|---|
| | 1 | 2 |
| High Purity SiC, 6/10 mesh | 9% | 9% |
| High Purity SiC, 10/16 mesh | 33 | 33 |
| High Purity SiC, 50/100 mesh | 10 | 10 |
| High Purity SiC, −100 mesh | 23 | 21.5 |
| Fine Calcined Alumina | 20 | 20 |
| Bentonite | 5 | 5 |
| Boron Phosphate | 0 | 1.5 |
| Plus Additions: | | |
| 75% Grade Phosphoric Acid | 7 | 7 |
| % Water to Press | 5.5 | 4.4 |
| Physical Properties | | |
| Workability at the Press | 29 | 33 |

The mixes were pressed into 9×4.5×2.5" brick at 1000 psi. The brick were subjected to tests typically used to evaluate plastics used in aluminum applications. These tests were carried out in order to simulate activity of the plastic before, during and after placement in an aluminum reverberatory furnace. The results are set forth in Table II below.

TABLE II

| | Example No. | |
|---|---|---|
| | 1 | 2 |
| Bulk Density, pcf | | |
| After Curing at 500° F. | 155 | 158 |
| After 1500° F. Reheat | 155 | 157 |
| Modulus of Rupture, psi | | |
| After 1500° F. Reheat | 1820 | 1980 |
| At 1500° F. | 2930 | 2870 |
| 1500° F. Reheat | | |
| % Linear Change | +0.2 | +0.1 |
| % Volume Change | 0.0 | +0.3 |
| ASTM C-704 Abrasion Test | | |
| After 1500° F. Reheat | | |
| Volume Eroded, cc | 8.4 | 4.2 |
| 72 Hr. Aluminum Cup Test | | |
| Using 7075 Alloy at 1500° F. | | |
| Depth of Aluminum Penetration | None | None |
| Degree of Aluminum Adherence | Strong | Moderate |
| Change in Metal Chemistry | | |
| Silicon (Si) | +0.33 | +0.02 |
| Iron (Fe) | +0.12 | +0.05 |

The results showed that the mix in Example 2 had higher density. The strength tests after reheating to 1500° F., the strength test at 1500° F., and the dimensional changes after the 1500° F. reheat indicated that the improved mix had strengths and dimensional control like the standard. The most noticeable improvements were realized in the abrasion test and in the aluminum cup test. The improved plastic clearly had exceptional resistance to molten aluminum corrosion as evidenced by the very low contamination of silicon and iron into the molten metal.

The improved mix was made commercially and placed in field trials. These field trials indicated that the plastic gave a significant improvement in service life.

It will be seen that the mixes made in accordance with the present invention have increased density, abrasion resistance, and resistance to aluminum penetration and reaction.

EXAMPLE 3

Boiler tube tile were made by preparing the mix set forth in the table below into shapes having the following dimensions, 6×6×¾" with a hole located in the tile and by pressing at 10,000 psi. The tile were cured at 1000° F. for four hours or burned at 2400° F. maximum.

The tile were then installed over boiler tubes in a commerical boiler. The results to-date are deemed to be very satisfactory.

| Mix: | |
|---|---|
| 96 Grade Silicon Carbide | |
| 6/10 mesh | 8% |
| 8/16 mesh | 34 |
| 30/50 mesh | 16.5 |
| −200 mesh | 24.5 |
| Ball Clay | 5 |
| Fine Calcined Alumina | 10 |
| Boron Phosphate | 2 |
| Plus Addition: | |
| 75% Grade Phosphoric Acid | 5 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A plastic refractory composition comprising, for each 100% by weight, about 50 to 90% silicon carbide grain having a SiC content of at least 92% SiC, 1 to 40% calcined or reactive alumina, 1 to 10% bentonite or ball clay, 0.5 to 5% boron phosphate, and for each 100% by weight of said composition, a phosphorous-containing liquid binder in an amount sufficient to bind the composition when used.

2. The plastic refractory composition of claim 1 wherein the SiC content of the silicon carbide grain is at least 95%.

3. The plastic refractory composition of claim 1 wherein there is 3 to 10% by weight bentonite and which also contains 0.1 to 5% by weight hydrated alumina.

4. The plastic refractory composition of claim 2, wherein there is 3 to 10% by weight bentonite and which also contains from 0.1 to 5% by weight hydrated alumina.

5. A pressed plastic refractory shape comprising a plastic refractory composition cured at a temperature and for a time sufficient to form a water-insoluble phosphate bond, said composition comprising a plastic refractory composition comprising for each 100% by weight, about 50 to 90% silicon carbide grain having a SiC content of at least 92% SiC, 1 to 40% calcined or reactive alumina, 1 to 10% ball clay, 0.5 to 5% boron phosphate, and for each 100% by weight of said composition, a phosphorous-containing liquid binder in an amount sufficient to bind the composition when used.

6. The shape of claim 5 in the shape of a tile wherein the SiC content of the silicon carbide grain is at least 95%.

7. The shape of claim 5 wherein said composition also contains from 0.1 to 5% by weight hydrated alumina.

8. The shape of claim 6 wherein said composition also contains from 0.1 to 5% by weight hydrated alumina.

9. The plastic refractory composition of claim 1 containing 1 to 10% of ball clay.

* * * * *